(12) United States Patent
Chromek et al.

(10) Patent No.: US 12,352,316 B2
(45) Date of Patent: Jul. 8, 2025

(54) BEARING ASSEMBLY FOR A PUMP AND A PUMP COMPRISING THE BEARING ASSEMBLY

(71) Applicant: Edwards S.R.O., Lutin (CZ)

(72) Inventors: Lukas Chromek, Lutin (CZ); Richard Glyn Horler, Burgess Hill (GB); Emiliano Lucchetta, Burgess Hill (GB)

(73) Assignee: Edwards S.R.O., Lutin (CZ)

( * ) Notice: Subject to any disclaimer, the term of this patent is extended or adjusted under 35 U.S.C. 154(b) by 36 days.

(21) Appl. No.: 18/256,333

(22) PCT Filed: Dec. 7, 2021

(86) PCT No.: PCT/EP2021/084606
§ 371 (c)(1),
(2) Date: Jun. 7, 2023

(87) PCT Pub. No.: WO2022/128636
PCT Pub. Date: Jun. 23, 2022

(65) Prior Publication Data
US 2024/0035517 A1    Feb. 1, 2024

(30) Foreign Application Priority Data
Dec. 15, 2020    (GB) ...................... 2019823

(51) Int. Cl.
*F16C 35/07*    (2006.01)
*F04D 29/056*    (2006.01)
(Continued)

(52) U.S. Cl.
CPC .......... *F16C 35/077* (2013.01); *F04D 29/056* (2013.01); *F16C 33/7869* (2013.01);
(Continued)

(58) Field of Classification Search
CPC .. F16C 19/06; F16C 33/7869; F16C 33/7886; F16C 33/80; F16C 33/805; F16C 35/06; F16C 2360/00; F04D 19/04; F04D 29/056
See application file for complete search history.

(56) References Cited

U.S. PATENT DOCUMENTS 1,979,388 A    11/1934  House
3,318,645 A *  5/1967   Sutowski ................ F16C 33/76
                                                            29/520
(Continued)

FOREIGN PATENT DOCUMENTS

EP    2557315 A2 *  2/2013  ............. F04D 19/04
FR    558527 A  *  8/1923
(Continued)

OTHER PUBLICATIONS

Machine Translation of EP-2557315-A2 (Year: 2013).*
(Continued)

*Primary Examiner* — Alan B Waits
(74) *Attorney, Agent, or Firm* — Theodore M. Magee; Westman, Champlin & Koehler, P.A.

(57) ABSTRACT

A bearing assembly for mounting a rotatable shaft of a pump and the pump are disclosed. The bearing assembly comprises: a bearing comprising an outer ring and an inner ring; a bearing support configured to support the outer ring of the bearing, the bearing support surrounding at least a portion of an outer surface of the outer ring extending across at least a portion of one end surface of the outer ring; and a shield extending from the bearing support towards the inner ring to thereby obscure at least a portion of an annular gap between the inner and outer ring.

8 Claims, 5 Drawing Sheets

(51) Int. Cl.
*F16C 19/06* (2006.01)
*F16C 33/78* (2006.01)
*F16C 33/80* (2006.01)
*F16C 35/077* (2006.01)
*F04D 19/04* (2006.01)

(52) U.S. Cl.
CPC .......... *F16C 33/7886* (2013.01); *F16C 33/80* (2013.01); *F04D 19/04* (2013.01); *F16C 19/06* (2013.01); *F16C 2360/00* (2013.01)

(56) References Cited

U.S. PATENT DOCUMENTS

| | | | |
|---|---|---|---|
| 3,844,010 A | | 10/1974 | Frost et al. |
| 4,452,497 A | * | 6/1984 | Zillhardt ................. F16C 33/80 |
| | | | 384/480 |
| 5,618,167 A | * | 4/1997 | Hirakawa ........... F04D 29/5853 |
| | | | 417/372 |
| 5,722,167 A | * | 3/1998 | Duchamp ............... F16C 39/02 |
| | | | 384/488 |
| 6,062,734 A | | 5/2000 | Bundgart |
| 6,234,293 B1 | * | 5/2001 | Fasoli ................... F16C 13/022 |
| | | | 193/37 |
| 8,297,949 B1 | | 10/2012 | Mancl et al. |
| 2005/0123226 A1 | | 6/2005 | Ostrander et al. |
| 2006/0261693 A1 | | 11/2006 | Baumgartner et al. |
| 2008/0112660 A1 | * | 5/2008 | Koch ................. F04D 29/0563 |
| | | | 384/397 |
| 2016/0018003 A1 | * | 1/2016 | Epshetsky ........... F16C 33/7886 |
| | | | 277/402 |
| 2016/0069391 A1 | | 3/2016 | Shimizu et al. |

FOREIGN PATENT DOCUMENTS

| | | |
|---|---|---|
| FR | 2866086 A1 | 8/2005 |
| JP | H034018 A | 1/1991 |
| JP | H06337016 A | 12/1994 |
| JP | H0925937 A | 1/1997 |
| JP | 2007051747 A | 3/2007 |
| JP | 2017082767 A | 5/2017 |
| WO | 2008035113 A1 | 3/2008 |

OTHER PUBLICATIONS

Machine Translation of FR-558527-A (Year: 1923).*
Japanese Notification of Reason for Rejection dated Jun. 24, 2024 for corresponding Japanese application Serial No. JP2023-536514, 8 pages.
British Search Report dated Apr. 26, 2021 for corresponding British application Serial No. GB2019823.0, 2 pages.
Notification of Transmittal of the International Search Report and the Written Opinion of the International Searching Authority, or the Declaration and PCT Search Report dated Apr. 4, 2022 for corresponding PCT application Serial No. PCT/EP2021/084606, 6 pages.
PCT Written Opinion dated Apr. 4, 2022 for corresponding PCT application Serial No. PCT/EP2021/084606, 7 pages.
PCT Notification of Transmittal of the International Preliminary Report on Patentability dated Feb. 23, 2023 and Response to International Preliminary Report dated Oct. 1, 2022 for corresponding PCT application Serial No. PCT/EP2021/084606, 16 pages.

* cited by examiner

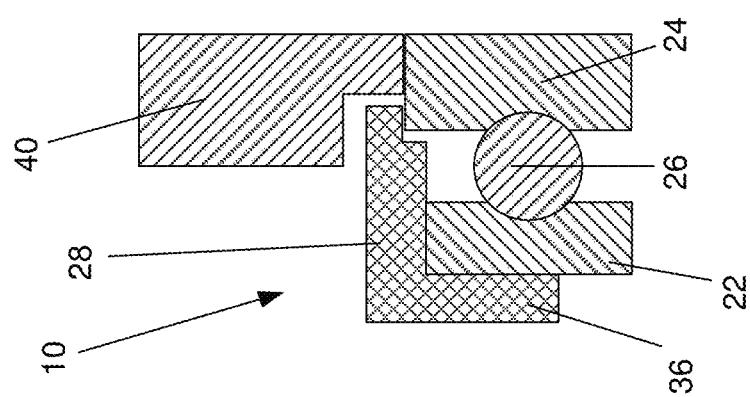

BEARING ASSEMBLY FOR A PUMP AND A PUMP COMPRISING THE BEARING ASSEMBLY

CROSS-REFERENCE OF RELATED APPLICATION

This application is a Section 371 National Stage Application of International Application No. PCT/EP2021/084606, filed Dec. 7, 2021, and published as WO 2022/128636 A1 on Jun. 23, 2022, the content of which is hereby incorporated by reference in its entirety and which claims priority of British Application No. 2019823.0, filed Dec. 15, 2020.

FIELD

The field of the invention relates to bearing assemblies for pumps and to pumps comprising such bearing assemblies.

BACKGROUND

The use of a bearing shield to inhibit lubricant leakage from the bearing is known.

One type of shield is the clip-on shield that clips to the outer race and covers the annular gap between the inner and outer race. Such a shield is flexible, and thus, in extreme conditions or failure of the bearing, may buckle or be dislodged and provide no protection against increased movement within the rotating assembly.

FIG. 1a shows an alternative prior art bearing assembly 10 that has a shield 28 that is integral with the outer race 22 of the bearing. This shield is configured to provide support for the axial damping ring 30 which is used to locate the bearing axially and provide the required stiffness and damping. In this example inner ring 24 of the bearing is mounted against shaft 40 and rolling element 26 is housed between inner ring 24 and outer ring 22, outer ring 22 supporting damping ring 32 and 30. This bearing assembly is one that is used in some turbomolecular pumps. The integral shield of the bearing assembly is more robust/stiffer than typical 'clip-on' seals. Due to its increased robustness it can act as an end stop in case of bearing failure limiting radial excursion of the inner ring and thus, the shaft and thereby protecting the pump from a radial touch within the pumping mechanism.

In this bearing the inner ring 24 is shorter than the outer rings 26 and the integral shield 28 faces the shaft.

Where the bearing is not supported by damping rings 30, 32 but rather by different types of bearing support, for example a resilient support, also known as a compact metal spring damper (CMSD) as described in WO2008035113, then the shield is not required to support the damping ring and clip-on shields can be used. Alternatively, the integral shield may be retained and the CMSD mounted around it. This is shown in FIG. 1b where shield 36 is integral with the outer ring 22 and the compact metal spring damper 36 is mounted around the outer ring 22 and integral shield 28.

Although a shield that is integral with the outer ring may be more robust, it does require a non standard bearing and additional room and can not be easily fitted to pumps that are conventionally designed for use with clip-on shields. Furthermore, bearings such as a deep groove ball bearing that require tilting of the rings during assembly cannot have a shield that is integral with the outer ring and faces the inner ring and the tight tolerances that are required to allow a small running clearance. To address this problem and provide tight tolerances while allowing bearing assembly the shield is configured to face the shaft and thus, such bearing assemblies require a special seat machined on the shaft.

It would be desirable to provide a bearing assembly with a shield that is robust, simple to assemble and in some cases uses a conventional bearing, is inexpensive and does not take up too much space.

The discussion above is merely provided for general background information and is not intended to be used as an aid in determining the scope of the claimed subject matter. The claimed subject matter is not limited to implementations that solve any or all disadvantages noted in the background.

SUMMARY

A first aspect provides a bearing assembly for mounting a rotatable shaft of a pump, said bearing assembly comprising: a bearing comprising an outer ring and an inner ring; a bearing support configured to support said outer ring of said bearing, said bearing support surrounding at least a portion of an outer surface of said outer ring extending across at least a portion of one end surface of said outer ring; and a shield extending from said bearing support towards said inner ring to thereby obscure at least a portion of an annular gap between said inner and outer ring.

Where a bearing assembly has a support that surrounds at least a portion of an axial length of the circumferential outer surface and extends across a portion of one end surface of the outer ring, this extension provides a location from which a shield can extend rather than the shield extending from the outer ring. This has advantages particularly where the shield is rigidly attached to the bearing support of providing not only effective lubricant retention but also robust protection. Having a shield that extends from the bearing support makes the bearing assembly easy to manufacture and assemble and in some embodiments allows a conventional bearing to be used. In this regard, the inner and the outer ring of deep groove ball bearings for example, need to be tilted and offset during mounting and thus, where the shield is attached to the bearing support they can be manufactured in the usual way and the bearing support and associated shield attached to them later.

Although the bearing support may have a number of forms, in some embodiments the bearing support comprises a compact metal spring damper.

A compact metal spring damper may comprise an inner hub for receiving the bearing and a concentric outer mount coupled with the inner hub by at least one resilient member. It surrounds a portion of the outer circumference of the outer ring and extends across a portion of an axial surface of the outer ring, the portion extending across the axial surface of the outer ring, provides a location from which the shield can extend.

In some embodiments, said shield is integral with said bearing support.

Providing the shield integral with the bearing support provides robust protection to the bearing which with the appropriate design may also allow the shield to act as a backup bearing in case of bearing failure. Furthermore, it is simple to manufacture and the shield is isolated from the bearing rings and thus, does not distort these rings when being manufactured, assembled or during use.

In other embodiments, said shield is attached to said bearing support.

An alternative to the shield being integral with the bearing support is to attach it perhaps by gluing or by press fitting with the bearing support. Gluing has an associated risk of contamination of the bearing, while a press fit may distort the outer ring and degrade the performance of the bearing.

In some embodiments, said shield is mounted between an axial end surface of said outer ring and said portion of said bearing support extending across said axial end surface.

In one embodiment, the shield may be mounted between the portion of the bearing support extending over the end surface of the outer ring and the outer ring such that it is held in place by the mounting of the bearing support on to the bearing.

In some embodiments, an inner surface of said outer ring comprises a recess at one end of said inner surface, said bearing support extending across said end surface towards said recess, said shield being mounted within said recess and abutting a surface of said bearing support.

There may be a recess in the outer ring inner surface and the shield may be mounted within and extend in an axial direction to contact the bearing support and in a radial direction towards the outer surface of the inner ring. This is a compact and effective way of providing a shield which does not increase the size of the bearing and yet provides robust and effective shielding. It does however, require some modification of the bearing. The shield may contact the radially inner surface of the bearing support or it may contact the surface of the bearing support that races the end surface of the outer ring.

In some embodiments, said shield is formed of a different material to said bearing support.

Where the shield is not integral with the bearing support then it may be formed of the same material or it may be formed of a different material. The properties required for the bearing support are different to those required for the shield and thus, there may be advantages in making them of different materials. The material selected for the shield will depend on the properties required for the shield.

In some embodiments, said shield is configured to provide at least one of an axial and radial end stop in case of failure of said bearing.

Providing a shield extending from the bearing support rather than one that is clipped into the outer ring provides potential for the shield to be formed as a thicker more robust component allowing it to provide at least one of an axial and radial end stop in case of failure of the bearing. In this regard, although failure of the bearing is a rare event, were it to occur then the radial and/or axial movement that it would allow could cause clashing of components within the pump. Where a shield is used the clearance gap between the shield and either the inner ring or the shaft is generally low to inhibit the leakage of lubricant. Where the shield is a robust component and where the radial gap is the smallest radial clearance within the pump, then were the bearing to fail any radial movement would result in the shield impacting either the inner ring or the shaft before any other surfaces touched. Upon impact the shield would protect from further movement and provide a radial backup bearing. Depending on the configuration axial movement may be protected in a similar manner.

In some embodiments, said shield is configured to provide both an axial and radial end stop in case of failure of said bearing.

In some embodiments, said shield has a thickness of between 0.4 to 5 mm preferably between 0.7 to 3 mm.

The shield in addition to inhibiting lubricant leakage is preferably used as an axial and/or radial end stop and as such should be robust enough to support the bearing in case of bearing failure. A shield thickness of between 0.5 to 4 mm and preferably between 0.7 and 3 mm is generally enough to provide the required protection.

The material of the shield may be a metallic material to provide robustness and in some embodiments is a steel alloy, or titanium. The thickness of the shield will depend on the material and where the material is a stronger material then the thickness may towards the lower end of the range.

In some embodiments, said shield is configured to extend towards an outer surface of said inner ring, an inner surface of said shield and said outer surface forming a clearance gap between them.

Although the shield may be configured to extend towards the shaft in some embodiments it extends towards an outer surface of the inner ring such that there is a radial clearance gap between the inner surface of the shield and the outer surface of the inner ring. This radial clearance gap can be configured to be limited in size such that were the bearing to fail there would be contact between the shield and inner ring before any other parts of the pump contacted each other.

In some embodiments, said inner ring comprises a recess in an outer surface at one end of said inner ring, said shield being configured to extend into said recess.

In some cases there is a recess in the outer surface at one end of the inner ring into which the shield may extend. This provides both radial and axial clearance gaps between the shat and inner ring which can provide both radial and axial protection for the pump in case of bearing failure.

In some embodiments, said inner ring is axially longer than said outer ring.

Where the shield extends up to the outer surface of the inner ring or into a recess in the outer surface of the inner ring then where the inner and outer ring have the same axial length the shield will need to have a bent portion otherwise it would extend above the inner ring. If the inner ring is axially longer than the outer ring then the shield can be substantially straight which may make it more robust and easier to manufacture.

In some embodiments, said shield is configured to extend beyond an outer surface of said inner ring In some cases, the shield may extend beyond the inner ring and the clearance gap may be between the shield and the shaft.

In some embodiments, said shield is formed of several different materials, an innermost surface of said shield forming one side of a clearance gap with a rotatable shaft of said pump or said inner ring comprising a different material to a material forming a majority of said shield.

It may be advantageous to form surfaces of the shield that may contact moving surfaces of a different material to that of the rest of the shield. In particular these surfaces may be formed of materials that have non-galling properties or low coefficients of friction, while the materials selected for the rest of the shield may be ones that are selected for their stiffness. For example, the majority of the shield may be titanium while the face adjacent to the clearance gap may be formed of a different material or have a coating of a different material. The material selected will depend on the material with which it forms a clearance gap. In some embodiments it may also be oleophobic to inhibit oil leaving the bearing.

A second aspect provides a pump comprising at least one rotatable shaft supporting a rotor within a stator, at least one of said at least one rotatable shaft being mounted on at least one bearing assembly according to a first aspect.

In some embodiments, said rotatable shaft comprises a recess in an outer surface, said bearing and shield extending into said recess In some embodiments, the bearing and shield may extend into a recess in the shaft. This may be more complicated to manufacture than a straight shaft but may provide axial protection in both axial directions and where appropriately configured provides radial protection as well. It may also make the bearing assembly easier to manufacture and assemble. In this regard the shield may extend into a recess within the bearing, or into a recess within the shaft, and/or into a recess formed partially by the bearing and partially by the shaft.

In some embodiments the pump comprises a vacuum pump. Vacuum pumps are expensive machines that rotate at a high speed and the applications where they are used may be sensitive to contamination by lubricants. Thus, the use of a shield to protect them from lubricant leakage can be advantageous and where the shield can also provide a backup facility then this can be particularly advantageous.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention will now be described further, with reference to the accompanying drawings, in which:

FIG. 8 shows an alternative embodiment where the bearing and shield are mounted within a recess within the shaft.

DETAILED DESCRIPTION

Before discussing the embodiments in any more detail, first an overview will be provided.

A protective bearing shield integral with a bearing support—for example the CMSD is disclosed. The integral shield provides sealing against oil loss from the bearing to the pump and also acts as an end stop in case of bearing failure limiting the radial and/or axial movement of the inner ring—and shaft relative to the outer ring and stator.

Embodiments provide a shield integral with the bearing support rather than the bearing. This allows the use of a more standard bearing design, as the bearing can be assembled prior to the shield and support being fitted to the bearing assembly, so that the shield does not affect assembly of the bearing.

Figure 1A:
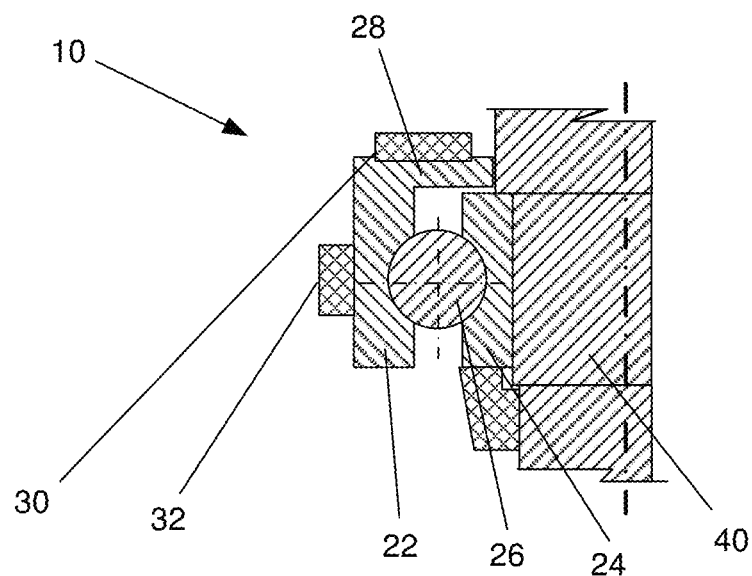
FIG. 1a shows a bearing assembly according to the prior art.
Figure 1B:
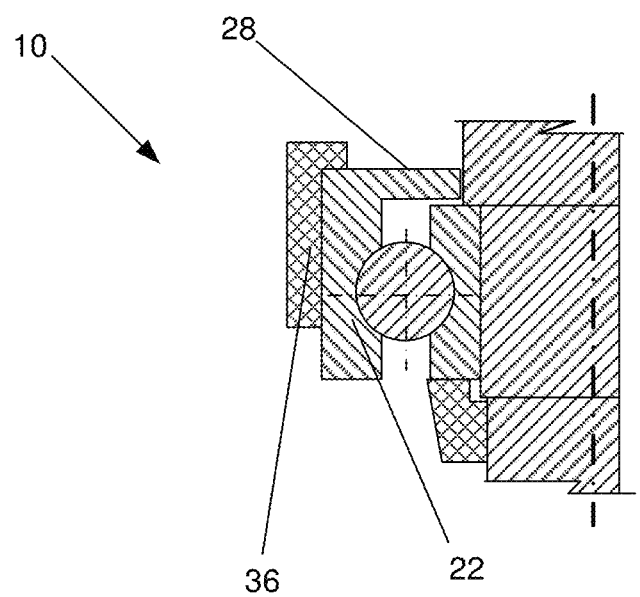
FIG. 1b shows a different example of a bearing assembly according to the prior art.
Figure 2:
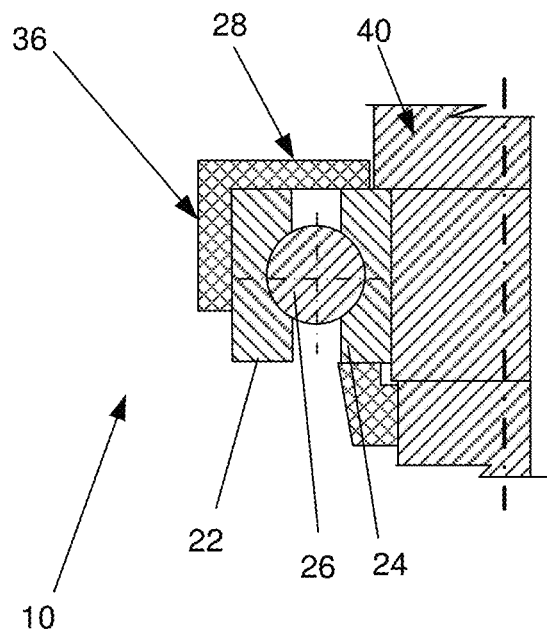
FIG. 2 shows a bearing assembly with a shield as part of a bearing support and with a clearance gap to the shaft.

FIG. 2 shows an embodiment where the bearing shield 28 is integral with the bearing support 36 which in this embodiment is in the form of CMSD. A standard bearing may be used with this bearing assembly, the bearing comprising an outer race 22 an inner race 24 and rolling elements 26. The radial inner surface of shield 28 faces shaft 40 and there is a clearance gap between the shaft and this surface. In the unlikely event that the bearing were to fail the shield would act as a radial stop limiting radial movement of the shaft beyond the width of the clearance gap and also as an axial stop limiting axial movement in one direction. Forming the clearance gap with the shaft makes the clearance gap more difficult to set accurately which, reduces the sealing efficiency and where the bearing provides a backup bearing function will increase tolerances in the rest of the pump.

Figure 3:
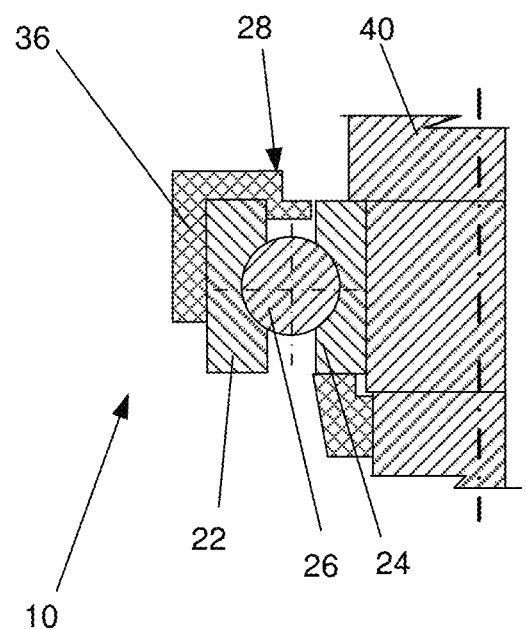
FIG. 3 shows a bearing assembly with a shield as part of the bearing support and a clearance gap with the inner ring.

FIG. 3 shows an alternative embodiment where the shield is again integral with the bearing support but in this embodiment the radial inner surface of shield 28 faces the bearing inner ring 24 rather than shaft 40. This allows the clearance gap to be more accurately set allowing close running clearances and use on pumps where clip-on shields were previously used. This clearance gap again sets a limit on radial movement in the unlikely event that the bearing fails. A standard bearing can also be used in this embodiment.

Figure 4:
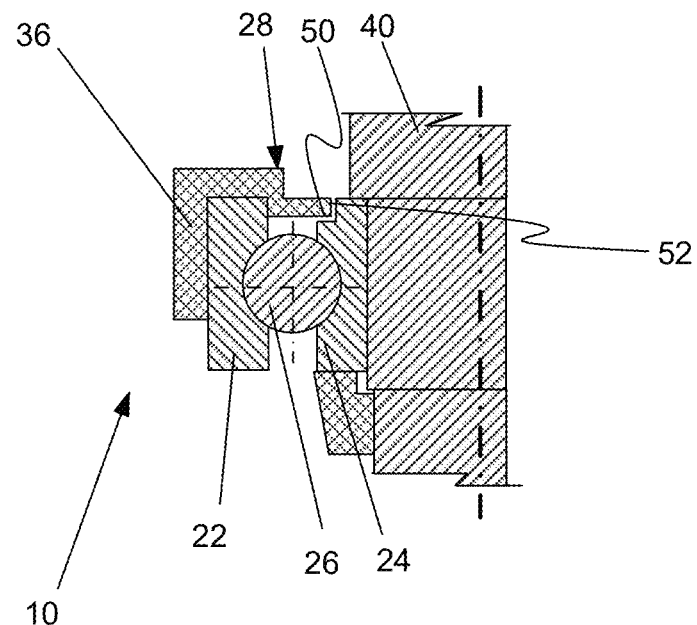
FIG. 4 shows a bearing assembly with a shield as part of the bearing support and with radial and axial clearance gaps with the inner ring.

FIG. 4 shows an alternative embodiment where again the shield 28 is integral with bearing support 36 and the clearance gap is between an inner axially extending surface 52 of the shield 28 and the inner ring 24. In this embodiment, the shield 28 extends into a recess in the inner axial end surface of inner ring 24 such that there is an axial clearance gap between inner ring 24 and a radially extending surface 50 of shield 28 and a radial clearance gap is between inner ring 24 and inner axially extending surface 52 of shield 28. Were the bearing to fail then axial and radial movement would be limited by the size of these clearance gaps and thus this bearing may provide both an axial in at least one direction and a radial backup bearing for the pump.

Figure 5:
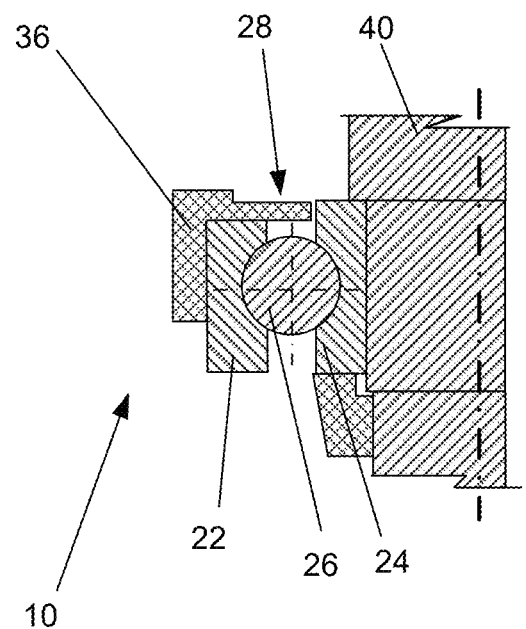
FIG. 5 shows an alternative embodiment of a bearing assembly with a shield extending from the bearing support and having a clearance gap with the inner ring.

FIG. 5 shows a similar design where again the shield 28 is integral with the bearing support 36 but in this case a non standard bearing is used. This bearing has an inner ring 24 that is shorter than the outer ring 22 and this allows the shield to be straight and still extend up to the inner ring 24 to form a clearance gap between the radially inner surface of shield 28 and the inner ring. This arrangement has the disadvantage of requiring a specialised bearing with an adapted inner or outer ring, but does allow the shield and bearing support to be manufactured and assembled in a more straightforward manner that does not require the shield to bend around the outer ring. Although in this embodiment there is no recess in the outer surface of inner ring 24, in other embodiments there may be such a recess such that axial and radial protection is provided by the shield.

Figure 6:
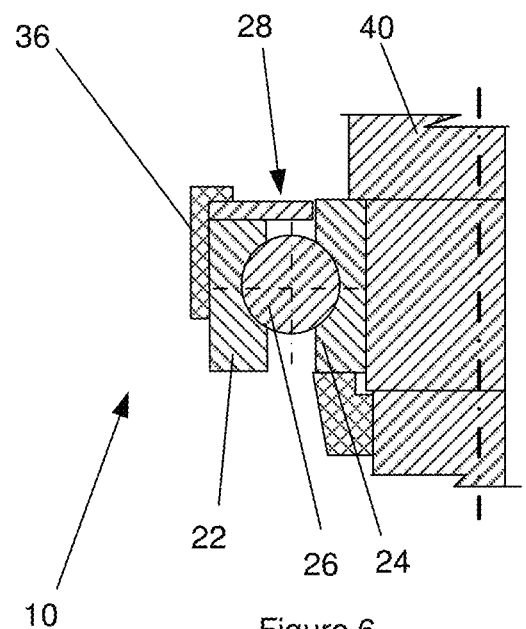
FIG. 6 shows an embodiment of a bearing assembly where the shield and bearing support are separate items.

FIG. 6 shows an alternative embodiment where bearing shield 28 is a separate element to the bearing support 36. This allows the shield 28 to be formed of a different material which may be selected according to the properties required. In this embodiment, the shield 28 in mounted between the bearing support and the outer ring 22 of the bearing. In this case, the bearing is not a standard bearing but has a shorter outer ring or a longer inner ring to accommodate the shield and allow it to face the inner ring 24.

In addition to the shield being formed of a different material to the bearing support, different portions of the shield may be formed of different materials. For example, the surface of the shield facing the radially outer surface of the inner ring 24 may be coated in a material with non-galling or low coefficient of friction properties thereby protecting the shield and the outer surface of the inner ring 24 were contact to occur.

Figure 7:
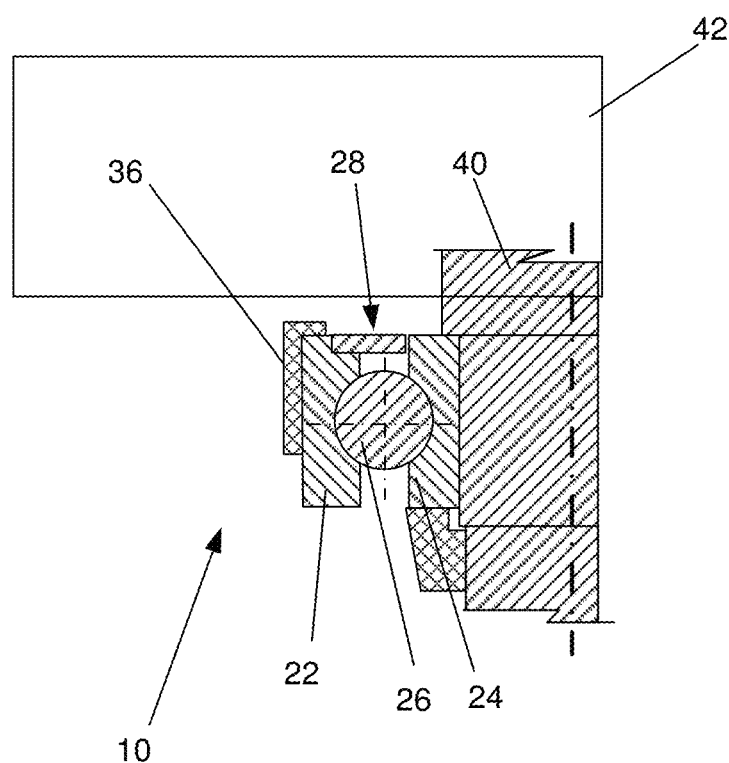
FIG. 7 shows a further example of a bearing assembly where the shield and bearing support are separate items.

FIG. 7 shows an alternative embodiment which is similar to the embodiment of FIG. 6 but there is a recess in an axial end of the radial inner surface of the outer ring 22. The shield 28 is mounted within this recess and extends axially to contact bearing support 36 which provides appropriate radial stiffness, the shield also extends radially across towards the inner ring 24 inhibiting lubricant from leaking from the bearing while also limiting radial movement in the case of bearing failure.

The bearing assembly of FIG. 7 and indeed of the other figures, is a section through one half of the assembly and supports the shaft 40 of a pump a half of which is shown schematically as 42. The shaft 40 supports a rotor within the pump that is configured to rotate within a stator and thereby pump a fluid. The pump 42 may be a vacuum pump where it is important to protect the vacuum from oil leakage. There may be a single shaft 40 with one bearing assembly or there may be two shafts each supported by a bearing assembly in the pumps of embodiments.

FIG. 8 is a further embodiment where the bearing assembly is mounted within a recess in shaft 40. In this embodiment the shield 28 is contoured such that it extends above the inner ring portion and faces the outer surface of the inner ring 24. Thus, there are axial and radial clearance gaps between the shield, the shaft and the inner ring which limit axial movement in both directions and radial movement were the bearing to fail. The clearance gaps are selected to be low to inhibit the leakage of lubricant and also to provide the backup bearing function such that were the bearing to fail the first surfaces to contact each other would be the surfaces forming the clearance gaps.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A bearing assembly for mounting a rotatable shaft of a pump, said bearing assembly comprising:
   a bearing comprising an outer ring and an inner ring;
   a bearing support comprising a metal spring damper configured to support said outer ring of said bearing, said bearing support surrounding at least a portion of an outer surface of said outer ring extending across at least a portion of one end surface of said outer ring;
   an outer surface of said inner ring comprising a recess; and
   a shield formed by the metal spring damper having an inner axially extending surface and a radially extending surface, the radially extending surface extending from the inner axially extending surface toward the outer ring to thereby obscure at least a portion of an annular gap between said inner and outer ring; wherein
   at least a part of the radially extending surface and at least a part of the inner axially extending surface are positioned within the recess of the inner ring and face the inner ring.

2. The bearing assembly according to claim 1, wherein said shield has a thickness of 0.5 to 4 mm.

3. The bearing assembly according to claim 1, wherein a clearance gap is between the inner axially extending surface and the inner ring within the recess.

4. The bearing assembly according to claim 3, wherein said inner ring is axially longer than said outer ring.

5. The bearing assembly according to claim 1, wherein the inner axially extending surface of said shield is formed of a different material than a material forming a majority of said shield.

6. A pump comprising at least one rotatable shaft mounted on at least one bearing assembly according to claim 1.

7. The pump according to claim 6, said pump comprising a vacuum pump.

8. The bearing assembly according to claim 1 wherein said shield is configured to provide at least one of an axial and radial end stop in case of failure of said bearing.

* * * * *